United States Patent
Zhan

(10) Patent No.: US 8,423,691 B2
(45) Date of Patent: Apr. 16, 2013

(54) COMPUTER DEVICE AND METHOD FOR RECOGNIZING A REMOVABLE STORAGE DEVICE

(75) Inventor: Yan-Yan Zhan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 27 days.

(21) Appl. No.: 13/172,861

(22) Filed: Jun. 30, 2011

(65) Prior Publication Data

US 2012/0137023 A1 May 31, 2012

(30) Foreign Application Priority Data

Nov. 26, 2010 (CN) .......................... 2010 1 0561037

(51) Int. Cl.
*G06F 3/00* (2006.01)
*G06F 13/12* (2006.01)
*G06F 13/38* (2006.01)

(52) U.S. Cl.
USPC .............................................. 710/74; 710/8

(58) Field of Classification Search ............... 710/8, 74
See application file for complete search history.

(56) References Cited

U.S. PATENT DOCUMENTS

2007/0043888 A1* 2/2007 Suzuki et al. .................. 710/62
2007/0204069 A1* 8/2007 Bhesania et al. ................. 710/8

OTHER PUBLICATIONS

"USB Safely Remove Help—How to rename a device or change its image?", Nov. 2, 2010, http://web.archive.org/web/20101102004701/http://safelyremove.com/help/ht_changeNameOrImage.htm.*

* cited by examiner

*Primary Examiner* — Farley Abad
(74) *Attorney, Agent, or Firm* — Altis Law Group, Inc.

(57) ABSTRACT

A system and a method for recognizing removable devices of a computer device, and displaying a dialog box to prompt whether a removable storage device needs to be renamed and if so to receive input data accordingly from a user, if a USB port has been newly connected to the removable storage device. The recognition method further includes acquiring a unique port number of the USB port actually connected to the removable storage device, and acquiring a device name of a system disk name of the removable storage device originally allocated by the computer device, if the removable storage device needs to be renamed. The recognition method further may utilize the unique port number of the USB port as the new device name of the removable storage device in renaming it.

12 Claims, 3 Drawing Sheets

COMPUTER DEVICE AND METHOD FOR RECOGNIZING A REMOVABLE STORAGE DEVICE

BACKGROUND

1. Technical Field

Embodiments of the present disclosure relate to recognition technology, and more particularly to a computer device and method for recognizing a removable storage device.

2. Description of Related Art

Removable disks are portable storage devices. When a computer device is connected to a plurality of removable disks, the computer device may allocate a device name and a system disk name for each of the removable disks, such as "removable disk (f:)". The computer device further displays the device name and the system disk name in a menu of "my computer" provided by the computer device. However, if the computer device is connected to multiple removable disks, distinguishing between the removable disks is not at all obvious, nor is it convenient to check each one.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable storage medium or other storage device. The non-transitory computer-readable storage medium, include CDs, DVDs, BLU-RAY, flash memory, and hard disk drives.

Figure 1:
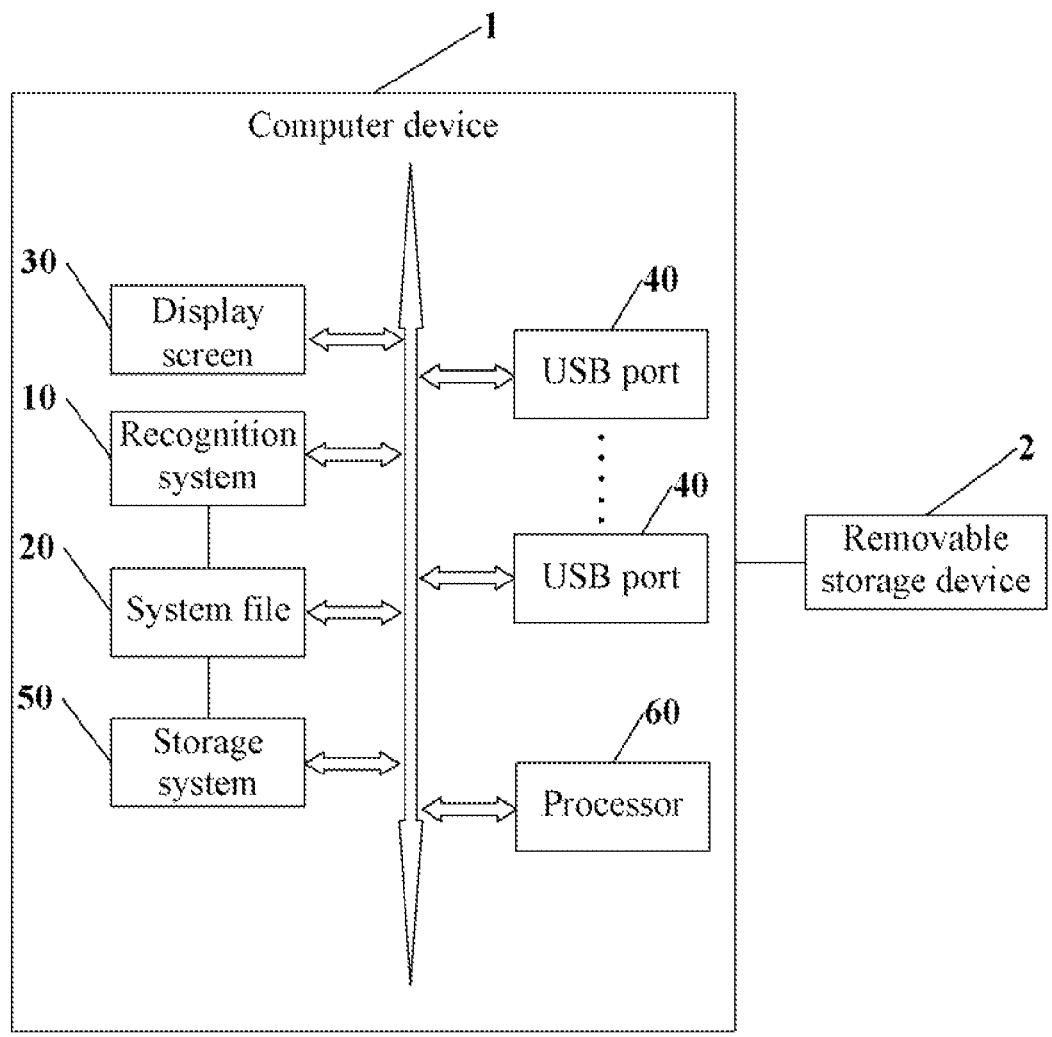
FIG. 1 is a schematic diagram of one embodiment of a computer device including a recognition system.

FIG. 1 is a block diagram of one embodiment of a computer device 1. The computer device 1 includes a recognition system 10, a system file 20, a display screen 30 and a plurality of Universal Serial Bus (USB) ports 40. The computer device 1 is in communication with a removable storage device 2 through one of the USB ports 40. The removable storage device 2 may be a USB flash disk or a portable hard disk, for example. The display screen 30 may display data (e.g., as icons, photos, and/or text) of the computer device 1. The recognition system 10 may rename the removable storage device 2 to more easily recognize that storage device. Detailed descriptions are provided below.

The system file 20 may display files of an operating system of the computer device 1 on the display screen 30. The operating system of the computer device 1 provides a "my computer" menu to reveal all system disk names within the computer device 1. If the computer device 1 is connected to the removable storage device 2 through one of the USB ports 40, the computer device 1 may recognize the particular removable storage device 2 and display it in the system file 20 for the information of a user.

The USB ports 40 may be connected to various peripheral devices, such as the removable storage device 2, a mouse, a keyboard, for example. Each of the USB ports 40 of the computer device 1 has a unique port number, such as USB port 1, and USB port 2, for example.

In some embodiments, the unique port number corresponding to each USB port 40 may be predetermined marked near the each of the USB ports 40 with a labels on a cover of computer device 1 in advance. For example, if the unique port number is one USB port 40 is "USB Port 1", a label with "USB Port 1" may be marked near the USB port 40. The user may distinguish each of the USB ports 40 with their own port number more efficiently.

The computer device 1 further includes a storage system 50 and at least one processor 60. The storage system 50 may store data for the computer device 1. The storage system 50 may be a memory of the computer device 1, or an external storage card, such as a smart media (SM) card, or a secure digital (SD) card. The at least one processor 60 executes one or more computerized codes of the computer device 1 and other applications, to provide the functions of the recognition system 10.

Figure 2:
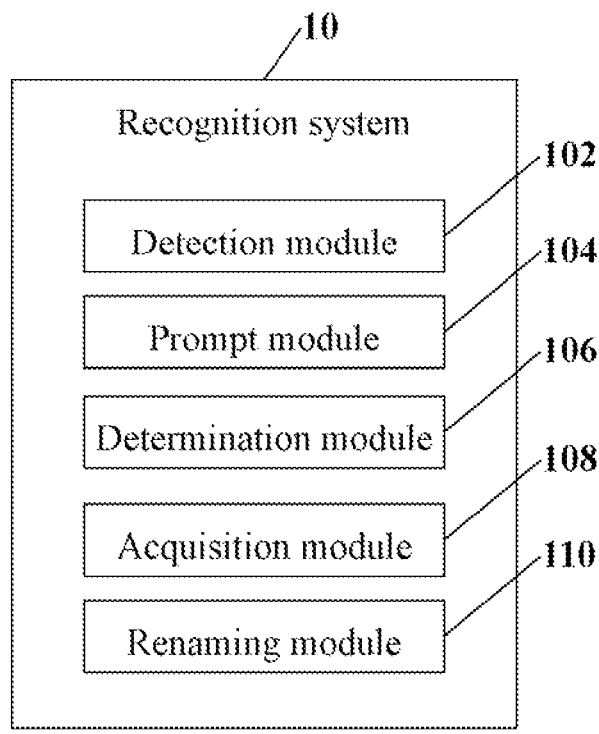
FIG. 2 is a block diagram of one embodiment of a recognition system of FIG. 1.

FIG. 2 is a block diagram of one embodiment of a recognition system 10 in the computer device 1 of FIG. 1. In some embodiments, the recognition system 10 may include a detection module 102, a prompt module 104, a determination module 106, an acquisition module 108, and a renaming module 110. The modules 102, 104, 106, 108 and 110 comprise computerized codes in the form of one or more programs that are stored in the storage system 50. The computerized code includes instructions that are executed by at least one processor 60 to provide functions for the modules 102, 104, 106, 108 and 110. Details of these operations are as follows.

The detection module 102 detects the USB ports 40 to determine whether one of the USB ports 40 is newly connected to the removable storage device 2. In some embodiments, newly connected represents that the removable storage device 2 being inserted into the USB ports 40 when the USB ports 40 are disconnected. The detection module 102 may detect a connection signal from the removable storage device 2 through one of the USB ports 40, and determine a USB port 40 that is newly connected the removable storage device 2.

If the determined USB port 40 is newly connected to the removable storage device 2, the prompt module 104 displays a message on the display screen 30 of the computer device 1 to prompt the user to determine if the user wants to rename the removable storage device 2. Data input by the user can rename the removable storage device. Before the user renames the removable storage device 2, the computer device 1 may display the device name and the system disk name of the removable storage device 2 which was initially allocated by the computer device on the system file 20, such as "removable disk (H:)", for example.

The determination module 106 determines whether the removable storage device 2 needs to be renamed in accordance with the input data from the user.

If the removable storage device 2 does need to be renamed, the acquisition module 108 acquires a unique port number of the determined USB port 40 connected to the removable storage device 2, and acquires the device name (e.g. removable disk) and the system disk name (e.g. (H:)) of the removable storage device 2. In some embodiments, the acquisition module 108 may acquire the unique port number through a device manager of the computer device 1. The system disk name of the removable storage 2 is acquired by traversing all the system disk names of the computer device 1, recording the port number which corresponds to each of the system disk names, and determining the system disk name which corresponds to the unique port number of the determined USB port 40 actually connected to the removable storage device 2.

The renaming module 110 regards the unique port number of the determined USB port 40 as the new device name of the removable storage device 2, and renames the removable storage device accordingly. The renaming module 110 further displays the new device name and the system disk name of the removable storage device 2 on the display screen 30. For example, if the port number of the determined USB port 40 connected to the removable storage device 2 is "USB port 1", the computer device 1 may display the device name and the system disk name of the removable storage device 2 in the system file 20, such as "removable disk (H:)". After renaming, the new device name and the system disk name may be displayed in the system file 20, such as "USB port 1 (H:)".

If the removable storage device 2 does not need to be renamed, the renaming module 110 maintains the device name of the removable storage device 2 in the computer device 1.

Figure 3:
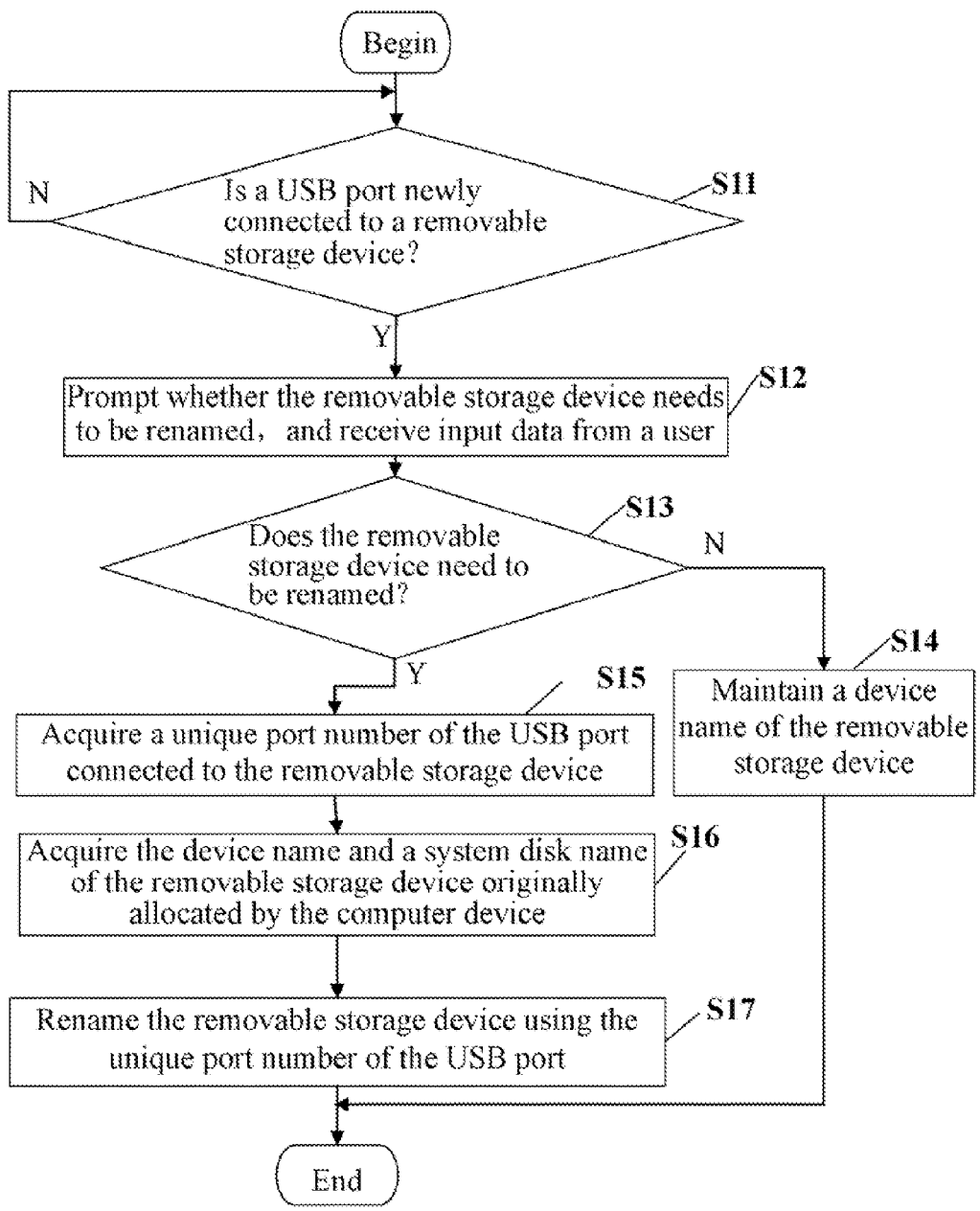
FIG. 3 is a flowchart of one embodiment of a method for recognizing a removable storage device of a computer device of FIG. 1.

FIG. 3 is a flowchart of one embodiment of a method for switching functions of the USB flash disk, such as, that of FIG. 1. Depending on the embodiment, additional blocks may be added, others deleted, and the ordering of the blocks may be changed.

In block S11, the detection module 102 detects the USB ports 40 to determine whether one of the USB ports 40 is newly connected to the removable storage device 2. If there is no USB port newly connected to the removable storage device 2, block S11 is repeated.

In block S12, if it is determined that a USB port 40 is newly connected to the removable storage device 2, the prompt module 104 displays a message on the display screen 30 of the computer device 1 to prompt whether the removable storage device 2 needs to be renamed, and receiving input data from the user.

In block S13, the determination module 106 determines whether the removable storage device 2 is required to be renamed according to the input data from the user.

If the removable storage device 2 does not need to be renamed, in block S14, the renaming module 110 maintains the device name of the removable storage device 2 in the computer device 1, and the procedure is ended.

If the removable storage device 2 does need to be renamed, in block S15, the acquisition module 108 acquires a unique port number of the determined USB port 40 actually connected to the removable storage device 2.

In block S16, the acquisition module 108 acquires a device name (e.g. removable disk) and a system disk name of the removable storage device 2 as originally allocated by the computer device 1.

In block S17, the renaming module 110 regards the unique port number of the determined USB port 40 as the new device name of the removable storage device 2 in renaming the removable storage device, and displays the new device name and the system disk name of the removable storage device 2 on the display screen 30.

The described exemplary embodiments are merely possible examples of implementations, and have been set forth for a clearer understanding of the principles of the present disclosure. Many variations and modifications may be made to the exemplary embodiments described without departing substantially from the spirit and principles of the present disclosure. All such modifications and variations are intended to be comprised herein within the scope of this disclosure and the described inventive embodiments, and the present disclosure is protected by the following claims.

What is claimed is:

1. A method for recognizing a removable storage device of a computer device, the computer device comprising Universal Serial Bus (USB) ports, the method comprising:

detecting the USB ports to determine whether one of the USB ports is newly connected to the removable storage device;

displaying a message on a display screen of the computer device to prompt whether the removable storage device needs to be renamed, and receiving input data from a user, upon the condition that one of the USB ports is newly connected to the removable storage device;

determining whether the removable storage device needs to be renamed according to the input data from the user;

acquiring a unique port number of the USB port connected to the removable storage device through a device manager of the computer device, and acquiring a device name and a system disk name of the removable storage device originally allocated by the computer device, upon the condition that the removable storage device needs to be renamed, wherein the unique port number of the USB port is marked near the USB port with a label on a cover of the computer device in advance;

regarding the unique port number of the USB port as a new device name of the removable storage device, to rename the removable storage device.

2. The method as claimed in claim 1, wherein the system disk name of the removable storage is acquired by:

traversing all system disk names of the computer device;

recording a port number corresponding to each of the system disk names;

determining the system disk name corresponding to the acquired unique port number of the USB port connected to the removable storage device.

3. The method as claimed in claim 1, further comprising:

maintaining a device name of the removable storage device in the computer device, upon the condition that the removable storage device does not need to be renamed.

4. The method as claimed in claim 1, further comprising:

displaying the new device name and the system disk name of the removable storage device on the display screen.

5. A non-transitory computer-readable storage medium storing a set of instructions, the set of instructions capable of executed by a processor to perform a method for recognizing removable storage devices of a computer device, the computer device comprising Universal Serial Bus (USB) ports, the method comprising:

detecting the USB ports to determine whether one of the USB ports is newly connected to the removable storage device;

displaying a message on a display screen of the computer device to prompt whether the removable storage device needs to be renamed, and receiving input data from a user, upon the condition that the USB port is newly connected to the removable storage device;

determining whether the removable storage device needs to be renamed according to the input data from the user;

acquiring a unique port number of the USB port connected to the removable storage device through a device manager of the computer device, and acquiring a device name of a system disk name of the removable storage device originally allocated by the computer device, upon the condition that the removable storage device needs to be renamed, wherein the unique port number of the USB port is marked near the USB port with a label on a cover of the computer device in advance;

regarding the unique port number of the USB port as a new device name of the removable storage device to rename the removable storage device.

6. The non-transitory computer-readable storage medium as claimed in claim 5, wherein the system disk name of the removable storage is acquired by:

traversing all system disk names of the computer device;

recording a port number corresponding to each of the system disk names;

determining the system disk name corresponding to the acquired unique port number of the USB port connected to the removable storage device.

7. The non-transitory computer-readable storage medium as claimed in claim 5, further comprising:

maintaining a device name of the removable storage device in the computer device, upon the condition that the removable storage device does not need to be renamed.

8. The non-transitory computer-readable storage medium as claimed in claim 5, further comprising:

displaying the new device name and the system disk name of the removable storage device on the display screen.

9. A computer device, comprising:

a display screen;

Universal Serial Bus (USB) ports;

a storage system, and at least one processor;

one or more programs that are stored in the storage system and are executed by the at least one processor, the one or more programs comprising:

a detection module operable to detect the USB ports to determine whether one of the USB ports is newly connected to a removable storage device;

a prompt module operable to display a message on a display screen to prompt whether the removable storage device needs to be renamed, and receiving input data from a user, upon the condition that the USB port is newly connected to the removable storage device;

a determination module operable to determine whether the removable storage device needs to be renamed according to the input data from the user;

an acquiring module operable to acquire a unique port number of the USB port connected to the removable storage device through a device manager of the computer device, and acquire a device name of a system disk name of the removable storage device originally allocated by the computer device, upon the condition that the removable storage device needs to be renamed, wherein the unique port number of the USB port is marked near the USB port with a label on a cover of the computer device in advance;

a renaming module operable to regard the unique port number of the USB port as a new device name of the removable storage device, to rename the removable storage device.

10. The computer device as claimed in claim 9, wherein the acquiring module acquires the system disk name of the removable storage by traversing all system disk names of the computer device, by recording a port number corresponding to each of the system disk names and by determining the system disk name corresponding to the acquired unique port number of the USB port connected to the removable storage device.

11. The computer device as claimed in claim 9, wherein the renaming module further maintain a device name of the removable storage device in the computer device, upon the condition that the removable storage device does not need to be renamed.

12. The computer device as claimed in claim 9, wherein the new device name and the system disk name of the removable storage device on the display screen.

* * * * *